Oct. 17, 1950     J. M. MONTEFALCO     2,526,389
PROTECTIVE MAT WITH SAFETY TREAD
Filed April 28, 1945     3 Sheets-Sheet 1
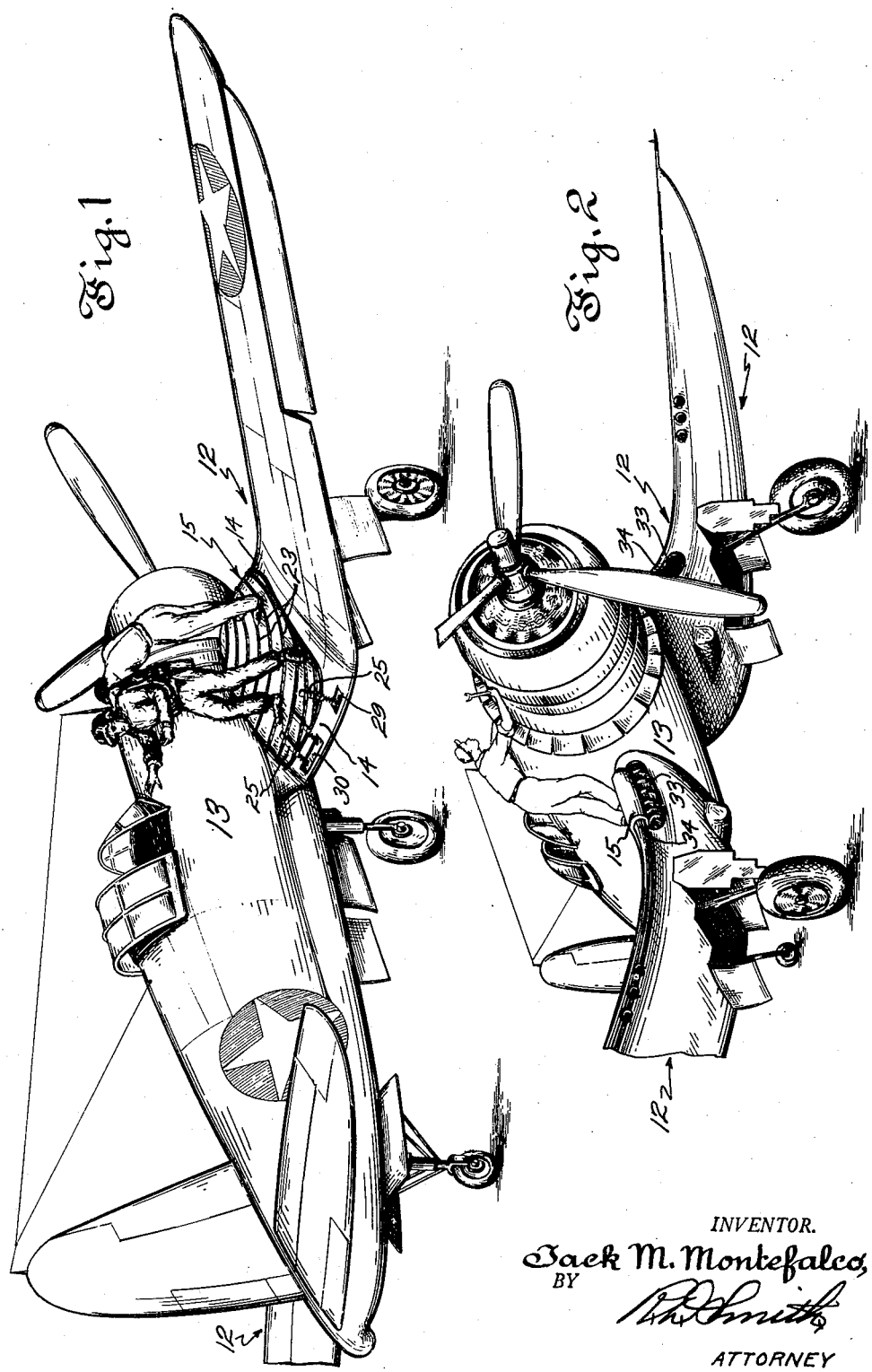
INVENTOR.
Jack M. Montefalco,
BY
ATTORNEY

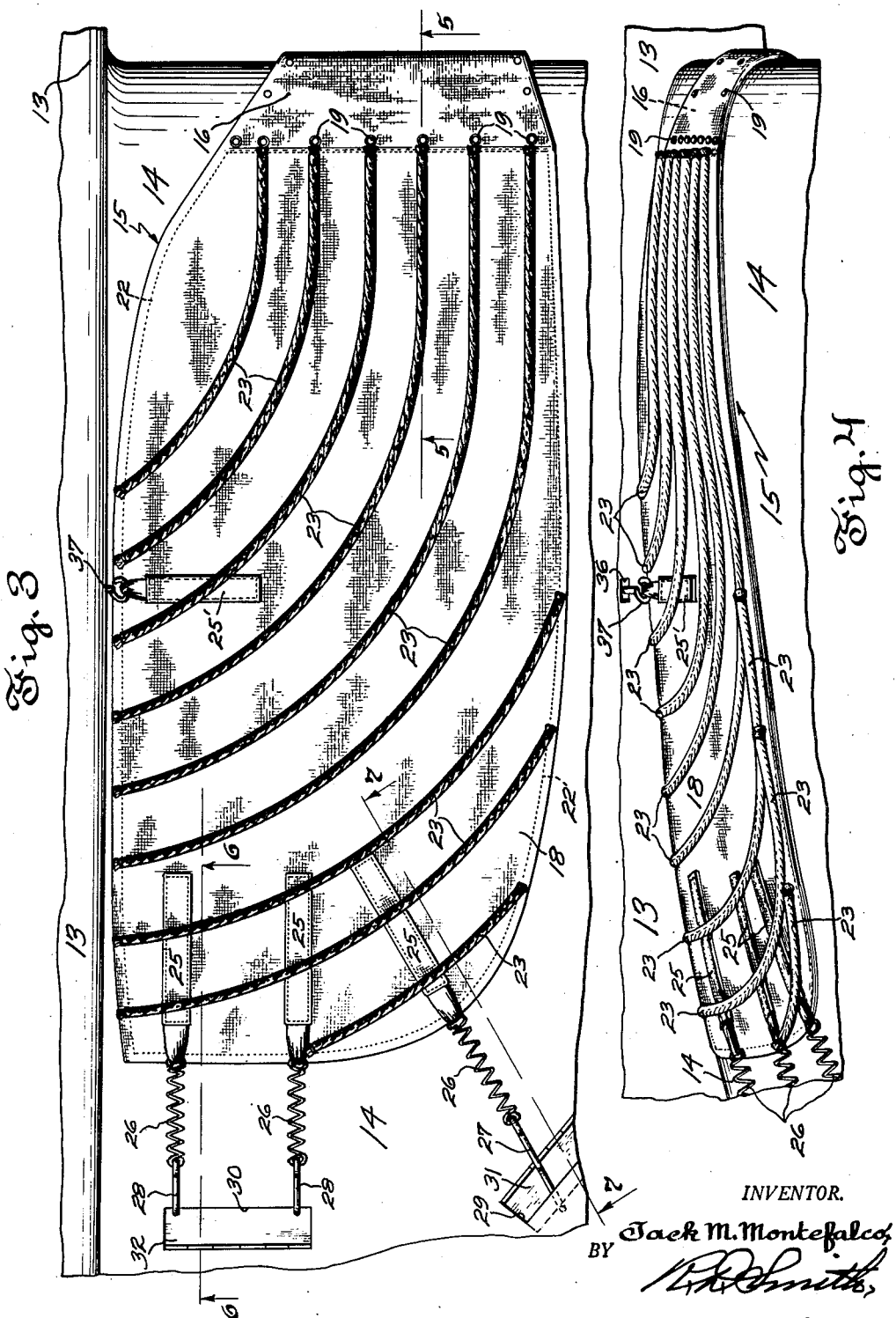

Oct. 17, 1950     J. M. MONTEFALCO     2,526,389
PROTECTIVE MAT WITH SAFETY TREAD
Filed April 28, 1945     3 Sheets-Sheet 3
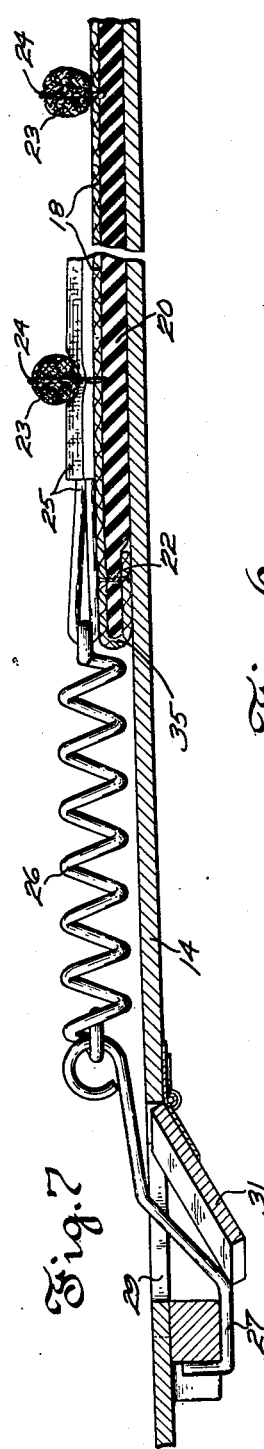
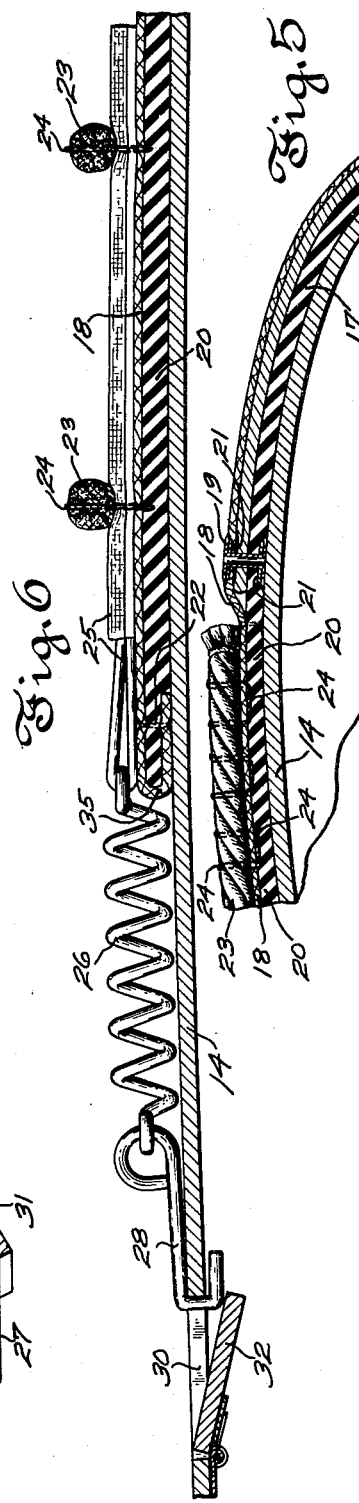
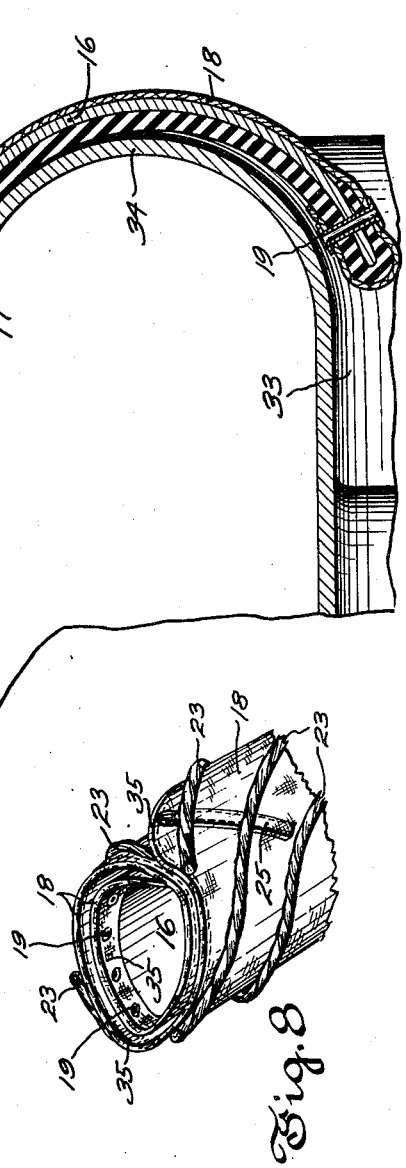
INVENTOR.
Jack M. Montefalco
BY
ATTORNEY Patented Oct. 17, 1950

2,526,389

UNITED STATES PATENT OFFICE 2,526,389

PROTECTIVE MAT WITH SAFETY TREAD

Jack M. Montefalco, Shelton, Conn., assignor to The Sponge Rubber Products Company, Shelton, Conn., a corporation of Connecticut Application April 28, 1945, Serial No. 590,785

16 Claims. (Cl. 244—1)

This invention relates to covering mats affording slip-proof foothold on sloping and/or convex-structural surfaces. It is particularly useful when embodied in a readily attachable and detachable mat for temporarily covering any sloping external upper surface of aircraft structure on which airplane mechanics must tread, as for instance the top airfoil surface of an airplane wing.

In certain types of fighter planes the top surface of each wing slopes downward in a rearward direction and slopes quite steeply downward in a lateral direction from its juncture with the fuselage. In certain of these planes the lateral slope of the wing immediately adjacent the fuselage is exceptionally steep which results in troublesome loss of footing for mechanics or pilots attempting to stand on or clamber upward over this steeply sloping wing surface. The trouble is aggravated by the necessity of extreme smoothness in the airfoil surface of an airplane wing. Such surface moreover is relatively fragile and subject to scraping and damage by the shoes of workmen attending the plane. In the course of servicing the engine the mechanic often must maintain a foothold on the steep sloping wing surface while bracing himself against the powerful backdraft of a running propeller while the engine is on test.

One object of the present invention is to provide safety for plane attendants by reducing or eliminating the aforementioned troubles to the end of speeding the safe progress of constructional or servicing work on the plane which requires standing on or clambering over the wing surface.

Another object is to provide a slip-proof foothold on an airfoil surface by means of a covering that shall be light and flexible so that it can be rolled up and easily carried about, as well as easily applied to and detached from the wing of an airplane.

A further object is so to construct a mat for this purpose that it will not only afford slip-proof foothold on a sloping surface but shall fully protect such surface against scraping and marring by the feet of workmen.

The foregoing and other objects will become apparent in greater detail from the following description of a satisfactory embodiment of the invention, which description has reference to the appended claims wherein:

Fig. 1 is a view looking obliquely toward the front of a fighter plane showing an attendant standing on my improved mat on one of the plane's steeply sloping wing surfaces as is necessary for servicing the engine and convenient for entering or leaving the cockpit.

Fig. 2 is a sidewise view of the same plane looking obliquely downward on a sloping area of the wing surface partially covered and protected by my improved foothold-affording mat.

Fig. 3 is a fragmentary plan view of my improved covering mat detachably anchored in place immediately adjacent the fuselage.

Fig. 4 is a fragmentary view looking edgewise at the mat toward the fuselage.

Fig. 5 is a considerably enlarged view of the front anchored end of the mat taken in section on the plane 5—5 in Fig. 3 looking in the direction of the arrows.

Fig. 6 is a fragmentary sectional view drawn on the same scale as Fig. 5 taken on the plane 6—6 in Fig. 3 looking in the direction of the arrows.

Fig. 7 is a correspondingly enlarged fragmentary view taken in section on the plane 7—7 in Fig. 3 looking in the direction of the arrows.

Fig. 8 is a perspective edgewise view of one end of the mat when coiled into a portable roll for easy carrying.

The plane pictured in Figs. 1 and 2 is of a familiar fighter type in which each wing 12 is joined to the fuselage 13 and slopes quite abruptly downward therefrom in its root region 14. The top external surfaces of the downward sloping wing portion 14 are airfoil surfaces which function to help sustain the plane in flight and consequently must be smooth, and nicely finished, and weatherproof. The difficulty of gaining and keeping a foothold on the wing surface 14, required by mechanics and pilots in their activities pictured in Figs. 1 and 2, is obvious. The double problem is presented of providing a covering for this top steeply sloping surface of the wing which not only shall afford slip-proof foothold for the plane attendants but which shall also effectively protect the nicely finished and rather fragile surface of the wing. These problems are solved by novel features in the construction of my improved mat 15 which also make the mat quickly and easily attachable and detachable, light in weight, and easily rolled for carrying about under the arm and storing in limited spaces when not in use.

The front anchorage end of my improved mat incorporates a stiff metal sheet arched into a sheet metal hook 16 as shown in Figs. 4, 5 and 6 lined on its inner or concave surface with a facing of preferably sponge rubber 17 which may be approximately one-quarter inch thick. Hook 16 is covered on its outer or convex surface by the front extension of a tough duck or canvas sheeting 18 which at the extreme free end of the sheet metal hook 16 loops inwardly around this hook end and laps over the sponge rubber lining 17, being secured by through eyelets 19. Similar eyelets 19 having washers 21 pass through a series of holes disposed along the border regions of sheet metal hook 16 and serve firmly to fasten together all marginal edge portions of canvas 18, lining 17 and the sheet metal hook. The full area and extent of the canvas blanket 18 is evident from Fig. 3. Throughout this full area the canvas is faced by an underlay of sheet sponge rubber 20 which may be about a quarter inch thick and rest directly against the wing surface. Neoprene cement is one of several adhesives which can be used to bond the sheet rubber 20 to the canvas carcass 18 throughout their area of surface contact. As shown in Figs. 6 and 7 the canvas 18 is preferably hemmed over the raw edge of the sheet sponge rubber 20 at 35 all the way around the mat and may be hemstitched through the sponge rubber sheet as by stitching 22.

Secured directly against and overlying the top surface of canvas 18 there are laterally spaced reaches of stout rope 23 which to advantage may be nearly an inch in diameter. I prefer to sew this rope to the canvas by very strong thread or cord 24 prior to applying the underlay of sponge rubber sheet to the canvas. After this I cement canvas 18 and sponge rubber 20 together as aforementioned to produce a laminated structure. Thus the ropes 23 serve as a stout ribbing giving secure footing on sloping support surfaces and the sponge rubber lamination 20 clings frictionally to the wing surface and protects the latter from marring and from sharp concentrated impacts which might rupture it. In some planes the wing surface itself will be composed of a stretched and varnished fabric.

At the rear end of the mat on the upper surface of canvas 18 and underlying ropes 23 there are securely sewed thereon several anchorage reinforcement straps 25 having looped ends near the outer edge of the laminated mat, in each of which looped ends there is hooked one end of a fastening device extending along the airfoil surface such as the spring coil 26. The other ends of two of these coils are coupled respectively to quick detachable anchorage hooks 27 while to the outer end of the third coil there is coupled a different shape of anchorage hook 28. Hooks 27 and 28, as best shown in Figs. 3, 6 and 7, are accommodated in openings 29 and 30 respectively, the former of which is normally closed by a trap door 31 and the latter of which is normally closed by a trap door 32 when the plane is in flight and the mat removed. The front edge of the wing contains a recess 33 for a ventilator grill and the top border 34 of this recess affords a thinned section of the front edge of the wing over which the sheet metal hook 16 can loop and anchor. Low down on the side of the fuselage near the wing there is a small anchorage opening 36 into which removably catches a hook 37 that is fastened to the mat by an additional anchorage strap 25'.

When out of service my improved mat may be rolled up as indicated in Fig. 8 and stored lying down or on end. Preferably the roll is of suitable size to be carried about under a workman's arm, the sheet metal hook 16 acting as a stiff core to render the roll rigid and easily manipulated. When carried to the airplane wing and unrolled the mat will be laid on the wing surface with its sponge rubber face down and then fastened in place by first anchoring its hooked end 16 over the wing edge 34 and then stretching the springs 26 sufficiently to insert hooks 27, 27 into opening 29 and hook 28 into opening 30 and hook 37 into opening 36. The mat is thus held stretched lengthwise by the springs 26 ready to be trod on by workmen and pilots in their activities illustrated in Figs. 1 and 2. When the plane is ready for flight, the mat is removed readily by disengaging hooks 16, 22, 28 and 37 from the edges of their respective openings and sliding the mat off the wing surface. It will be observed that each rope follows as nearly as possible a horizontal plane thereby to receive foot thrust in a direction perpendicular to it.

Since other flexible ribbing may be substituted for ropes 23 and other soft, resilient and clinging substances may be substituted for sponge rubber and forms of fasteners other than the mat holding hooks herein shown may be utilized, and the carcass may have more than two laminations neither of which need of necessity be a fabric as long as it is sufficiently stout and flexible, some of the following claims are directed to and intended to cover characteristics of the inventions which may be embodied in various and sundry forms other than the particular materials and shapes and arrangements of parts herein illustratively specified.

I claim:

1. A protective mat for affording firm foothold on sloping smooth support surfaces, embodying a tough flexible textile sheeting of sufficient tensile strength to withstand the weight of a person when treading on a steeply sloping area of said sheeting, and a plurality of elongated flexible ridge forming elements linked together by flexible portions of said sheeting and laterally spaced sufficiently to admit into treading contact with said textile sheeting between said ridge forming elements at least a portion of a person's foot, said ridges upstanding sufficiently from the top face of said sheeting to present a holding abutment to a person's foot operative positively to check foot slippage along a steep downward slope of said sheeting.

2. A protective mat for affording firm foothold on sloping smooth support surfaces, embodying a tough flexible sheeting of sufficient tensile strength to withstand the thrust of a person's weight, and a plurality of lengths of rope overlying the top face of said sheeting and fastened thereto with sufficient firmness and with sufficient width of lateral spacing between said lengths of rope to admit into treading contact with said sheeting between said lengths of rope at least a portion of the foot of a person treading on a steeply sloping area of said face, said rope being of sufficient thickness to present an abutment to a person's foot operative positively to check slipping thereof along a steep downward slope of said sheeting.

3. A protective mat for affording firm foothold on sloping smooth support surfaces, embodying a tough flexible sheeting of sufficient tensile strength to withstand the thrust of a person's weight, comprising a textile webbing, and a plurality of lengths of rope overlying the top face of said sheeting and stitched against one surface of said webbing with sufficient firmness and sufficient width of lateral spacing between said lengths of rope to admit into treading contact with said sheeting between said lengths of rope at least a portion of the foot of a person treading on a steeply sloping area of said face, said sheeting further comprising a thickness of sponge rubber adhered to the opposite surface of said webbing from said rope substantially throughout the area of contact of said webbing and sponge rubber, and said rope being of sufficient thickness to present an abutment to a person's foot operative positively to check slipping thereof along a steep downward slope of said sheeting.

4. A protective mat for affording firm foothold on sloping smooth support surfaces, embodying a tough flexible sheeting of sufficient tensile strength to withstand the thrust of a person's weight, comprising a textile webbing, and a plurality of lengths of rope overlying the top face of said sheeting and stitched against one surface of said webbing with sufficient firmness and sufficient width of lateral spacing between said lengths of rope to admit into treading contact with said sheeting between said lengths of rope at least a portion of the foot of a person treading on a steeply sloping area of said face, said sheeting further comprising a thickness of soft resilient clingy substance adhered to the surface of said webbing opposite from said rope substantially throughout the area of contact of said webbing and said substance, and said rope being of sufficient thickness to present an abutment to a person's foot operative positively to check slipping thereof along a steep downward slope of said sheeting.

5. Sure footing equipment for temporarily protecting airfoil surfaces of aircraft, embodying in combination with an airfoil surface of curving contour, a flexible blanket, foothold affording ropes fastened to and projecting above the upper face of said blanket in laterally spaced relation, and temporary blanket anchorage means including at least one fastening device extending along the airfoil surface arranged to couple a marginal portion of said blanket to said aircraft in a manner to hold said flexible blanket stretched in directions tending to maintain the lateral spacing of said ropes.

6. Sure footing equipment for temporarily protecting airfoil surfaces of aircraft, embodying in combination with an airfoil surface of curving contour, a flexible blanket having a portion of its thickness facing the airfoil surface comprising cellular rubber, foothold affording ropes fastened to and projecting above the upper face of said blanket in laterally spaced relation, and temporary blanket anchorage means including at least one fastening device extending along the airfoil surface arranged to couple a marginal portion of said blanket to said aircraft in a manner to hold the flexible blanket stretched in directions tending to maintain the lateral spacing of said ropes.

7. Sure footing equipment for temporarily protecting airfoil surfaces of aircraft, embodying in combination with an airfoil surface of curving contour, a flexible blanket comprising a lamination of stout textile sheeting and a lamination of cellular rubber united face to face substantially throughout the area of the blanket, foothold affording ropes fastened to and projecting above the upper face of said blanket in laterally spaced relation, and temporary blanket anchorage means including at least one fastening device extending along the airfoil surface arranged to couple a marginal portion of said blanket to said aircraft in a manner to hold the flexible blanket stretched in directions tending to maintain the lateral spacing of said ropes.

8. Sure footing equipment for temporarily protecting airfoil surfaces of aircraft, embodying in combination with an airfoil surface of curving contour, a flexible blanket, foothold affording ropes fastened to and projecting above the upper face of said blanket in laterally spaced relation, and temporary blanket anchorage means arranged to couple a marginal portion of said blanket to said aircraft in a manner to hold the flexible blanket stretched in directions tending to maintain the lateral spacing of said ropes, said anchorage means including fastening hooks anchored to the aircraft and longitudinally extensible coils of spring wire extending along the airfoil surface and pivotally coupled to said hooks and connecting the latter to said marginal portion of the blanket.

9. Sure footing equipment for temporarily protecting airfoil surfaces of aircraft, embodying in combination with an airfoil surface of curving contour, a flexible blanket, foothold affording ropes firmly stitched to said blanket throughout their individual lengths and projecting above the upper face of said blanket in laterally spaced relation, and temporary blanket anchorage means including at least one fastening device extending along the airfoil surface arranged to couple a marginal portion of said blanket to said aircraft in a manner to hold the flexible blanket stretched in directions tending to maintain the lateral spacing of said ropes.

10. Sure footing equipment for temporarily protecting airfoil surfaces of aircraft, embodying in combination with an airfoil surface of curving contour, a flexible blanket, foothold affording ropes fastened to and projecting above the upper face of said blanket in laterally spaced relation, temporary blanket anchorage means including at least one fastening device extending along the airfoil surface arranged to couple a marginal portion of said blanket to said aircraft in a manner to hold the flexible blanket stretched in directions tending to maintain the lateral spacing of said ropes, and a stiffly arched sheet metal hook fastened to and extending outward from one margin of the said flexible blanket for anchoring said margin to said aircraft.

11. Sure footing equipment for temporarily protecting airfoil surfaces of aircraft, embodying in combination with an airfoil surface of curving contour, a flexible blanket comprising a lamination of stout textile, foothold affording ropes fastened to and projecting above the upper face of said blanket in laterally spaced relation, temporary blanket anchorage means including at least one fastening device extending along the airfoil surface arranged to couple a marginal portion of said blanket to said aircraft in a manner to hold said flexible blanket stretched in directions tending to maintain the lateral spacing of said ropes, and a stiffly arched sheet metal anchorage hook having at least one surface covered by said textile lamination fastened to and extending outward from one margin of the said flexible blanket for anchoring said margin to said aircraft.

12. Sure footing equipment for temporarily protecting airfoil surfaces of aircraft, embodying in combination with an airfoil surface of curving contour, a flexible blanket comprising a lamination of stout textile and a lamination of cushioning material, foothold affording ropes fastened to and projecting above the upper face of said blanket in laterally spaced relation, temporary blanket anchorage means including at least one fastening device extending along the airfoil surface arranged to couple a marginal portion of said blanket to said aircraft in a manner to hold the flexible blanket stretched in directions tending to maintain the lateral spacing of said ropes, and a stiffly arched sheet metal anchorage hook sandwiched fixedly between extended marginal portions of said laminations for anchoring said extended marginal portions to said aircraft.

13. In combination with a steeply sloping upfacing airfoil surface of an aircraft, a protective mat for covering and affording firm foothold on said airfoil surface including, a flexible blanket, and a ribbing of laterally spaced flexible rope strands fixed to the upper surface of said blanket and extending in directions mainly transverse to the direction of slope of said airfoil surface.

14. In combination with a steeply sloping upfacing airfoil surface of an aircraft, a protective mat for covering and affording firm foothold on said airfoil surface comprising a flexible blanket including a thickness of sponge rubber contacting with said airfoil surface, and a ribbing of laterally spaced flexible rope strands fixed to the upper surface of said blanket and extending in directions mainly transverse to the direction of slope of said airfoil surface.

15. In combination with a steeply sloping upfacing airfoil surface of an aircraft containing apertures with anchorage shoulders located below said airfoil surface accessible through said apertures, a protective mat for covering and affording firm foothold on said airfoil surface comprising, a flexible blanket, and a ribbing of laterally spaced flexible rope strands fixed on the upper surface of said blanket and extending in directions mainly transverse to the direction of slope of said airfoil surface, together with hooks attached to said blanket shaped and arranged to enter said apertures and to engage retentively with said anchorage shoulders for inhibiting rumpling of said mat on said airfoil surface when subjected to oblique foot thrust of a person treading thereon.

16. In combination with a steeply sloping upfacing airfoil surface of an aircraft containing apertures with anchorage shoulders located below said airfoil surface accessible through said apertures, a protective mat for covering and affording firm foothold on said airfoil surface including, a flexible blanket, a ribbing of laterally spaced flexible rope strands fixed to the upper surface of said blanket and extending in directions mainly transverse to the direction of slope of said airfoil surface, hooks attached to said blanket shaped and arranged to enter said apertures and to engage retentively with said anchorage shoulders, and extensible springs coupling said hooks to said mat in a manner to resist rumpling of the latter on said airfoil surface when subjected to oblique foot thrust of a person treading thereon.

JACK M. MONTEFALCO.

REFERENCES CITED

The following references are of record in the file of this patent:

UNITED STATES PATENTS

| Number | Name | Date |
| --- | --- | --- |
| 213,437 | Mellon | Mar. 18, 1879 |
| 722,135 | Nunan | Mar. 3, 1903 |
| 1,352,733 | Egerton | Sept. 14, 1920 |
| 1,427,448 | Dornier | Aug. 29, 1922 |
| 1,616,637 | Rankin | Feb. 8, 1927 |
| 1,622,171 | Anthony | Mar. 22, 1927 |
| 1,704,095 | Matthews | Mar. 5, 1929 |
| 1,732,933 | Frazier | Oct. 22, 1929 |